(12) United States Patent
Mao (10) Patent No.: US 12,239,093 B1
(45) Date of Patent: Mar. 4, 2025

(54) CAT LITTER BOX

(71) Applicant: Jiangsu Schwarzwald Tech Co., Ltd., Jiangsu (CN)

(72) Inventor: Ruiyuan Mao, Jiangsu (CN)

(73) Assignee: Jiangsu Schwarzwald Tech Co., Ltd., Suzhou (CN)

( * ) Notice: Subject to any disclaimer, the term of this patent is extended or adjusted under 35 U.S.C. 154(b) by 0 days.

(21) Appl. No.: 18/934,283

(22) Filed: Nov. 1, 2024

(51) Int. Cl.
*A01K 1/01* (2006.01)

(52) U.S. Cl.
CPC .................. *A01K 1/0114* (2013.01)

(58) Field of Classification Search
CPC ..... A01K 1/0114; A01K 1/0107; A01K 31/04
See application file for complete search history.

(56) References Cited

U.S. PATENT DOCUMENTS

| | | | | |
|---|---|---|---|---|
| 5,477,812 A * | 12/1995 | Waters | ................ | A01K 1/0114 119/166 |
| 7,997,230 B2 * | 8/2011 | Cook | ................ | A01K 1/0114 119/166 |
| 8,156,895 B2 * | 4/2012 | Caputa | ................ | A01K 1/0114 119/166 |
| 9,526,226 B2 * | 12/2016 | Plazarte | ................ | A01K 1/0114 |
| RE47,347 E * | 4/2019 | Thaler | ................ | A01K 1/0114 |
| 12,127,529 B2 * | 10/2024 | Anderson | ................ | A01K 1/0114 |
| 2014/0069343 A1 * | 3/2014 | Loveday | ................ | A01K 1/0132 119/166 |

* cited by examiner

*Primary Examiner* — Yvonne R Abbott-Lewis (57) ABSTRACT

A cat litter box, including a main body, a moving part and a mounting part, wherein the main body includes side walls, a linear slot is disposed in each of the linear slots, and a traveling rack and a first lift driving rack are disposed in the linear slot; a driving motor and a shaft part are disposed on the moving part, the driving motor is connected with a traveling gear, the traveling gear is meshed with the traveling rack, the shaft part is rotatably disposed on the moving part, a transmission gear and a lift driving gear are disposed on the shaft part, and the transmission gear is meshed with the first lift driving rack; and the mounting part is disposed on the moving part in a liftable way and is connected with rake teeth, and a lifting rack is disposed on the mounting part.

15 Claims, 6 Drawing Sheets

CAT LITTER BOX

TECHNICAL FIELD

The present application relates to the technical field of pet supplies, in particular to a cat litter box.

BACKGROUND

A cat litter box is a toilet article for pet cats and can facilitate cleaning feces and urine of the pet cats. Therefore, for people who like to keep pet cats, the cat litter box is essential.

Traditional cat litter boxes have simple structures basically characterized in that a layer of cat litter is spread in the cat litter box. After defecating or urinating every time, a pet cat picks up cat litter to cover up the feces or urine, and then, the feces or urine is regularly cleaned by a user. In order to relieve the use burden of the user, an electric cat litter box capable of automatically cleaning feces in cat litter has appeared on the market. The electric cat litter box includes a main body and a moving part movably disposed on the main body, wherein the moving part is provided with a rake component, when the feces in the cat litter are cleaned, the moving part drives the rake component to move, and the feces in the cat litter are driven to a collection box by the rake component so as to be collected, the collection box is generally set to be higher than an accommodating area for accommodating cat litter on the main body, and therefore, when the moving part moves to a position close to the collection box, the rake component moves automatically, obliquely and upwards so as to drive the feces to fall from the top to the interior of the collection box. For some of existing products, the rake component ascends or descends relative to the main body by designing a movement path of the moving part, which makes the design of the movement path of the moving part complex and increases the research and development costs.

SUMMARY

A technical problem to be solved by the present application is to provide a cat litter box with a moving part of which a movement path is simple.

In order to solve the above-mentioned technical problem, the present application adopts the technical solution that: a cat litter box includes:

a main body, the main body including a base plate, an end wall and two side walls, two opposite sides of the base plate being respectively connected with the side walls, one end of the base plate being connected to the end wall, the end wall being respectively connected to the two side walls, an inclined guide wall being disposed on the other end of the base plate, a linear slot being disposed in each of the side walls, a traveling rack and a first lift driving rack being disposed in the linear slot, and the first lift driving rack being disposed to be away from the end wall;

a moving part, a driving motor and a shaft part being disposed on the moving part, the driving motor being connected with a traveling gear, the traveling gear being meshed with the traveling rack, the shaft part being rotatably disposed on the moving part, and a transmission gear and a lift driving gear being fixedly disposed on the shaft part, and the transmission gear being used to be meshed with the first lift driving rack; and a mounting part, the mounting part being disposed on the moving part in a liftable way and being connected with a plurality of rake teeth, and a lifting rack meshed with the lift driving gear being disposed on the mounting part.

The beneficial effects lie in that a movement path of the moving part in the cat litter box is linear, and therefore, the linear slot only needs to be disposed in each of the side walls of the main body, which lowers the design difficulty of the movement path of the moving part and is beneficial to the reduction of research, development and design costs; moreover, the mounting part can be lifted without an additional power source, and when the moving part moves to a preset range, the mounting part can be automatically lifted, which is beneficial to the simplification of the structure of the cat litter box and the reduction of parts and the assembling and manufacturing costs of the cat litter box.

DESCRIPTION FOR REFERENCE NUMERALS 1, main body; 11, base plate; 111, inclined guide wall; 12, end wall; 13, side wall; 131, linear slot; 14, traveling rack; 15, first lift driving rack; 16, second lift driving rack;

2, moving part; 21, driving motor; 22, shaft part; 23, traveling gear; 24, transmission gear; 25, lift driving gear; 26, first guide wheel; 27, transmission shaft; 28, second guide wheel; 29, fixed seat;

3, mounting part; 31, lifting rack; 32, elastic clamping block; 321, first abutting plane; 322, guide surface; 33, supporting portion; 34, first limiting portion; 35, limiting area; 36, guide slot; 361, vertical rib;

4, rake teeth;

51, collection box; 52, box cover; 53, contact arm;

6, seat body; 61, second limiting portion; 62, second abutting plane; 63, guide block.

DETAILED DESCRIPTION OF THE EMBODIMENTS

In order to describe the disclosed technical contents and achieved objects and effects in detail, the following description is shown in conjunction with implementations and in cooperation with the accompanying drawings.

Refer to FIG. 1 to FIG. 7, a cat litter box includes:

a main body 1, the main body 1 including a base plate 11, an end wall 12 and two side walls 13, two opposite sides of the base plate 11 being respectively connected with the side walls 13, one end of the base plate 11 being connected to the end wall 12, the end wall 12 being respectively connected to the two side walls 13, an inclined guide wall 111 being disposed on the other end of the base plate 11, a linear slot 131 being disposed in each of the side walls 13, a traveling rack 14 and a first lift driving rack 15 being disposed in the linear slot 131, and the first lift driving rack 15 being disposed to be away from the end wall 12;

a moving part 2, a driving motor 21 and a shaft part 22 being disposed on the moving part 2, the driving motor 21 being connected with a traveling gear 23, the traveling gear 23 being meshed with the traveling rack 14, the shaft part 22 being rotatably disposed on the moving part 2, and a transmission gear 24 and a lift driving gear 25 being fixedly disposed on the shaft part 22, and the transmission gear 24 being used to be meshed with the first lift driving rack 15; and a mounting part 3, the mounting part 3 being disposed on the moving part 2 in a liftable way and being connected with a plurality of rake teeth 4, and a lifting rack 31 meshed with the lift driving gear 25 being disposed on the mounting part 3.

It can be known from the above-mentioned description that the beneficial effects lie in that a movement path of the moving part 2 in the cat litter box is linear, and therefore, the linear slot 131 only needs to be disposed in each of the side walls 13 of the main body 1, which lowers the design difficulty of the movement path of the moving part 2 and is beneficial to the reduction of research, development and design costs; moreover, the mounting part 3 can be lifted without an additional power source, and when the moving part 2 moves to a preset range, the mounting part 3 can be automatically lifted, which is beneficial to the simplification of the structure of the cat litter box and the reduction of parts and the assembling and manufacturing costs of the cat litter box.

Further, the cat litter box further includes a collection box 51 having an opening in the top, wherein the collection box 51 is placed on the other end of the base plate 11 and is close to the inclined guide wall 111.

It can be known from the above-mentioned description that the collection box 51 is used for collecting feces of pets.

Further, the cat litter box further includes a box cover 52 used for sealing the opening of the collection box 51, wherein the box cover 52 is provided with a contact arm 53 used for contacting with the moving part 2 and is rotatably connected to the side walls 13 or the collection box 51.

It can be known from the above-mentioned description that the opening of the collection box 51 is sealed by the box cover 52, thereby reducing peculiar smell; and when moving in the preset range, the moving part 2 drives the box cover 52 to rotate, thereby opening or closing the box cover 52.

Further, a first guide wheel 26 is disposed on the moving part 2, and the first guide wheel 26 is located in the linear slot 131 and is in contact with the side walls 13.

It can be known from the above-mentioned description that the first guide wheel 26 avoids the unexpected rotation of the moving part 2 during movement, which is beneficial to ensuring the working stability of the cat litter box.

Further, the driving motor 21 is connected to the traveling gear 23 by a transmission shaft 27, a second guide wheel 28 is disposed on the transmission shaft 27, and the second guide wheel 28 is located in the linear slot 131 and is in contact with the side walls 13.

It can be known from the above-mentioned description that due to the arrangement of the second guide wheel 28, the working stability of the cat litter box is further improved, and it is ensured that the moving part 2 cannot rotate.

Further, the moving part 2 is provided with a fixed seat 29, the shaft part 22 and the transmission shaft 27 are respectively and rotatably disposed on the fixed seat 29, and the first guide wheel 26 is rotatably disposed on the fixed seat 29.

It can be known from the above-mentioned description that the existence of the fixed seat 29 can facilitate the assembly of the shaft part 22, the transmission shaft 27 and the first guide wheel 26.

Further, a second lift driving rack 16 is further disposed in the linear slot 131, the second lift driving rack 16 is disposed to be close to the end wall 12 and is used to be meshed with the transmission gear 24, a plurality of slotting teeth are disposed in the main body 1, and the slotting teeth are disposed to correspond to gaps between every two adjacent rake teeth 4.

It can be known from the above-mentioned description that when the moving part 2 is reset, the rake teeth 4 ascends, residual feces between two adjacent rake teeth 4 are scrapped by the slotting teeth fixed in the main body 1 in the ascending process of the rake teeth 4, and thus, the rake teeth 4 are cleaned.

Further, the cat litter box further includes a seat body 6, wherein the rake teeth 4 are disposed on the seat body 6, and the seat body 6 is detachably connected to the mounting part 3.

It can be known from the above-mentioned description that when the seat body 6 is dismounted by a user, the rake teeth 4 can be dismounted at the same time, and thus, it is convenient for the user to clean the rake teeth 4.

Further, the seat body 6 and the rake teeth 4 are of an integrated structure formed by integrated processing.

It can be known from the above-mentioned description that the seat body 6 and the rake teeth 4 are formed by integrated processing, which facilitates producing the rake teeth 4 and the seat body 6.

Further, elastic clamping blocks 32, a supporting portion 33 and a first limiting portion 34 are disposed on the mounting part 3, limiting areas 35 are formed between each of the elastic clamping blocks 32 and the supporting portion 33, and the first limiting portion 34 is disposed to correspond to the limiting areas 35; the seat body 6 is limited in the limiting areas 35 and is provided with a second limiting portion 61; and the first limiting portion 34 cooperates with the second limiting portion 61 to stop the seat body 6 from separating from the mounting part 3 from one side of the limiting areas 35.

It can be known from the above-mentioned description that the seat body 6 with the rake teeth 4 is clamped and fixed by the elastic clamping blocks 32 on the mounting part 3; when a user needs to dismount the rake teeth 4, the limitation of the mounting part 3 on the seat body 6 can be dismounted by pressing the elastic clamping blocks 32, so that the seat body 6 is withdrawn from the limiting areas 35; when the rake teeth 4 are mounted by the user, the seat body 6 directly slides to the limiting areas 35 along the mounting part 3; and the dismounting and mounting processes of the seat body 6 and the mounting part 3 are very simple and convenient, which brings convenience for the user to clean the rake teeth 4 and is beneficial to the enhancement of the use experience of the user.

Further, the second limiting portion 61 is a clamping slot that is L-shaped or T-shaped.

It can be known from the above-mentioned description that the second limiting portion 61 is simple in structure and convenient to process.

Further, bottoms of the elastic clamping blocks 32 are provided with first abutting planes 321, and the upper part of the seat body 6 is provided with a second abutting plane 62 in contact with the first abutting planes 321.

It can be known from the above-mentioned description that the elastic clamping blocks 32 are in contact with the seat body 6, so that the seat body 6 is limited more stably.

Further, a guide slot 36 is disposed in the mounting part 3, a guide block 63 cooperating with the guide slot 36 is disposed on the seat body 6, the guide block 63 is slidably disposed in the guide slot 36 in a first direction, the first limiting portion 34 stops the seat body 6 from separating from the mounting part 3 in a second direction, and the second direction is vertical to the first direction.

It can be known from the above-mentioned description that the guide slot 36 cooperates with the guide block 63, so that it is more convenient for a user to mount the seat body 6 to the mounting part 3.

Further, the elastic clamping blocks 32 are provided with guide surfaces 322 that are inclined surfaces or arc surfaces.

It can be known from the above-mentioned description that the guide surfaces 322 guide the elastic clamping blocks 32 to deform after abutting against the seat body 6, so that a user does not needs to operate the elastic clamping blocks 32 when mounting the seat body 6 on the mounting part 3, and it is convenient for the user to mount the seat body 6 with the rake teeth 4.

Further, two elastic clamping blocks 32 are provided, and the two elastic clamping blocks 32 are spaced side by side.

It can be known from the above-mentioned description that the two elastic clamping blocks 32 makes the seat body 6 stressed more uniformly and also facilitates the double-hand operation of the user.

EMBODIMENTS

Refer to FIG. 1 to FIG. 7, a cat litter box includes a main body 1, a moving part 2 and a mounting part 3, wherein the main body 1 includes a base plate 11, an end wall 12 and two side walls 13, two opposite sides of the base plate 11 are respectively connected with the side walls 13, one end of the base plate 11 is connected to the end wall 12, the end wall 12 is respectively connected to the two side walls 13, an inclined guide wall 111 is disposed on the other end of the base plate 11, a linear slot 131 is disposed in each of the side walls 13, a traveling rack 14 and a first lift driving rack 15 are disposed in the linear slot 131, and the first lift driving rack 15 is disposed to be away from the end wall 12; a driving motor 21 and a shaft part 22 are disposed on the moving part 2, the driving motor 21 is connected with a traveling gear 23, the traveling gear 23 is meshed with the traveling rack 14, the shaft part 22 is rotatably disposed on the moving part 2, and a transmission gear 24 and a lift driving gear 25 are fixedly disposed on the shaft part 22, and the transmission gear 24 is used to be meshed with the first lift driving rack 15; and the mounting part 3 is disposed on the moving part 2 in a liftable way and is connected with a plurality of rake teeth 4, and a lifting rack 31 meshed with the lift driving gear 25 is disposed on the mounting part 3.

Refer to FIG. 1 to FIG. 5, when the driving motor 21 drives the traveling gear 23 to rotate, the traveling gear 23 advances in the linear slot 131, and therefore, the moving part 2 moves linearly; when the moving part 2 moves to a preset position, the transmission gear 24 starts to be meshed with the first lift driving rack 15, the moving part 2 further moves, and the transmission gear 24 rotates to drive the shaft part 22 to rotate, so that the lift driving gear 25 rotates; and then, the lifting rack 31 drives the mounting part 3 to lift, thereby achieving the purpose of lifting the rake teeth 4.

In one or more embodiments, the first lift driving rack 15 corresponds to the inclined guide wall 111, and when the transmission gear 24 rotates on the first lift driving rack 15, bottom ends of the rake teeth 4 are lifted among the inclined guide wall 111.

Figure 1:
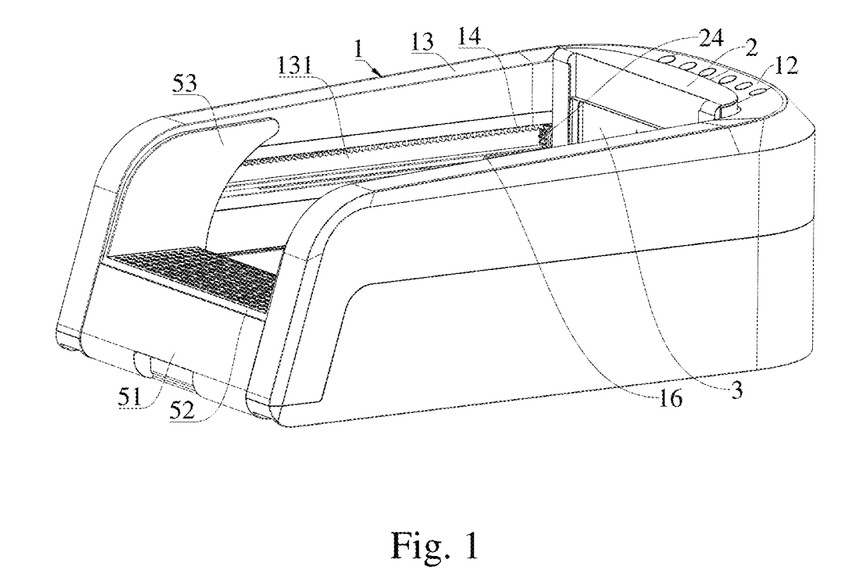
FIG. 1 is a schematic structural view of a cat litter box.

The end wall 12 and the two side walls 13 are connected to form a U-shaped structure, and the base plate 11 is fixedly or detachably connected to the U-shaped structure.

The cat litter box further includes a collection box 51 having an opening in the top, wherein the collection box 51 is placed on the other end of the base plate 11 and is close to the inclined guide wall 111, and when the bottom ends of the rake teeth 4 obliquely ascend along the inclined guide wall 111, feces in cat litter are pushed into the collection box 51.

The cat litter box further includes a box cover 52 used for sealing the opening of the collection box 51, when the box cover 52 covers the collection box 51, peculiar smell of the feces in the collection box 51 cannot escape from the collection box 51, or the concentration of the peculiar smell outside the collection box 51 is reduced. The box cover 52 is provided with a contact arm 53 used for contacting with the moving part 2 and is rotatably connected to the side walls 13 or the collection box 51.

Figure 2:
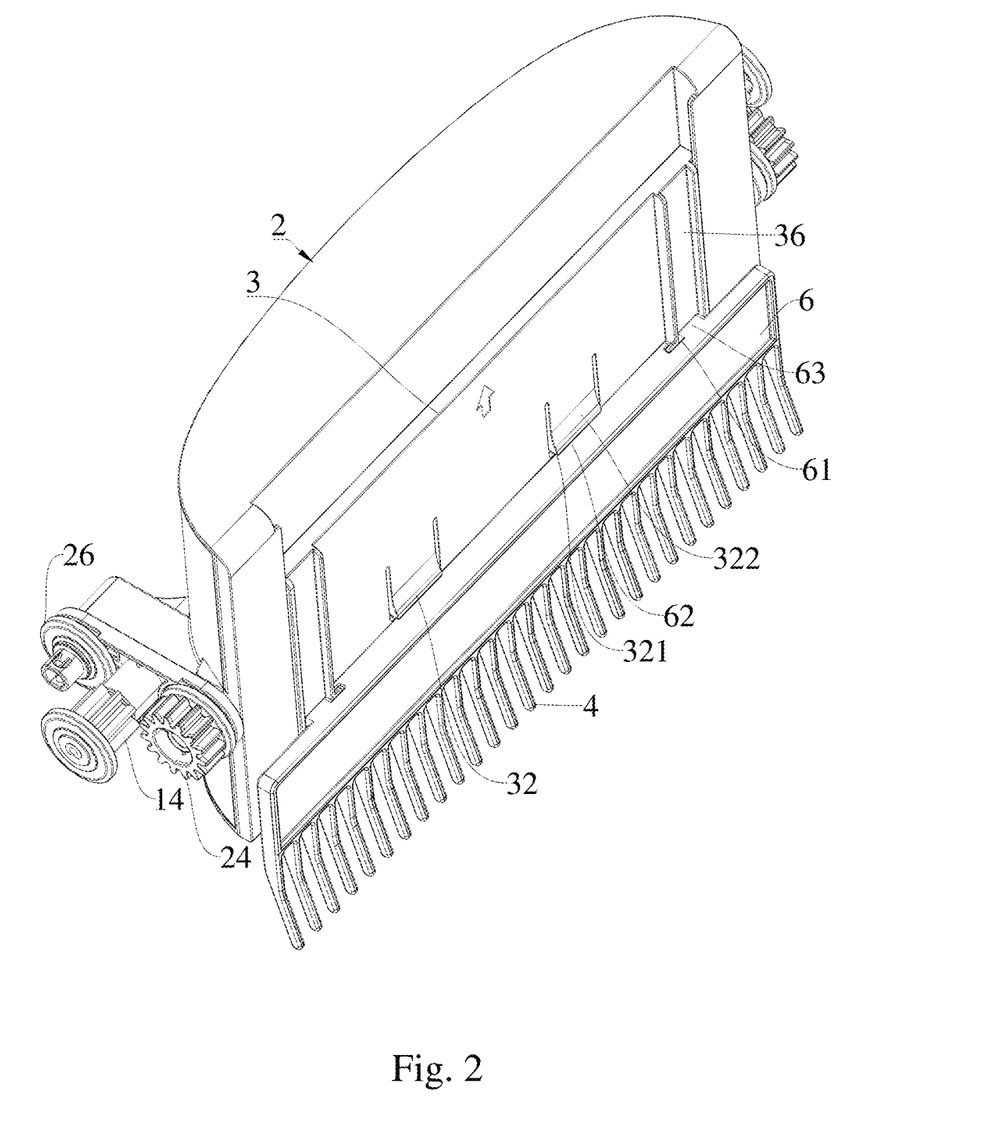
FIG. 2 is a schematic structural view of a moving part in the cat litter box.
Figure 3:
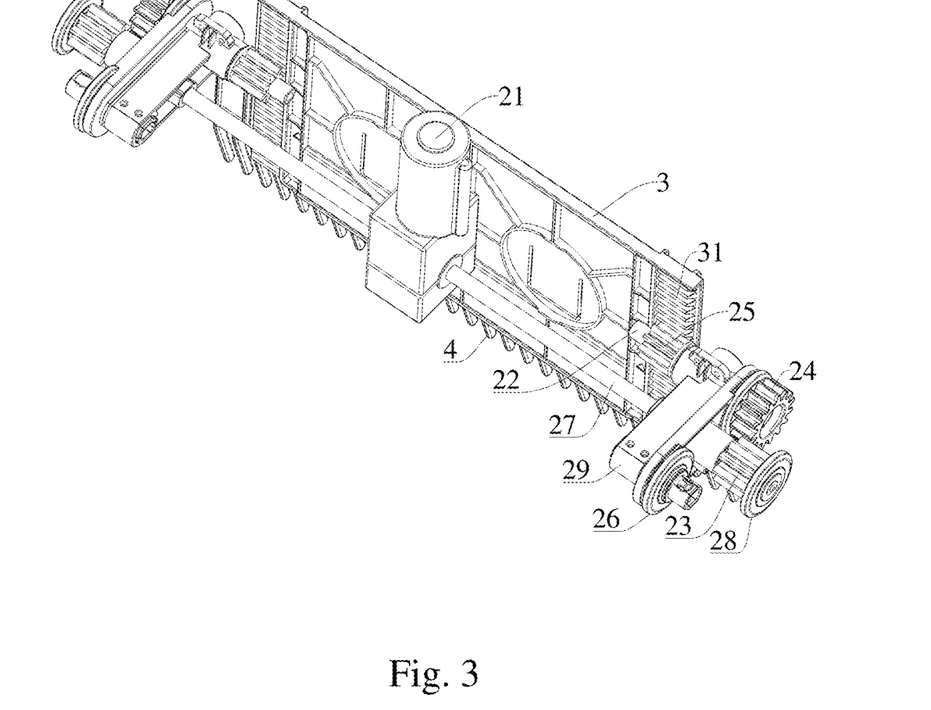
FIG. 3 is a schematic structural view of a partial structure of the moving part in the cat litter box.

A first guide wheel 26 is disposed on the moving part 2, and the first guide wheel 26 is located in the linear slot 131 and is in contact with the side walls 13.

In one or more embodiments, the driving motor 21 is connected to the traveling gear 23 by a transmission shaft 27, a second guide wheel 28 is disposed on the transmission shaft 27, and the second guide wheel 28 is located in the linear slot 131 and is in contact with the side walls 13.

In some embodiments, the moving part 2 is provided with a fixed seat 29, the shaft part 22 and the transmission shaft 27 are respectively and rotatably disposed on the fixed seat 29, and the first guide wheel 26 is rotatably disposed on the fixed seat 29.

Figure 4:
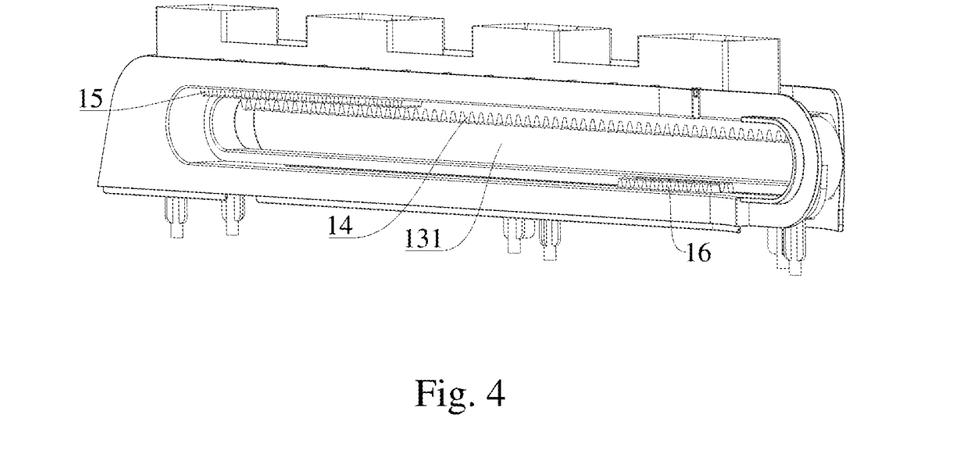
FIG. 4 is a schematic structural view of a partial structure of a side wall of the cat litter box.
Figure 5:
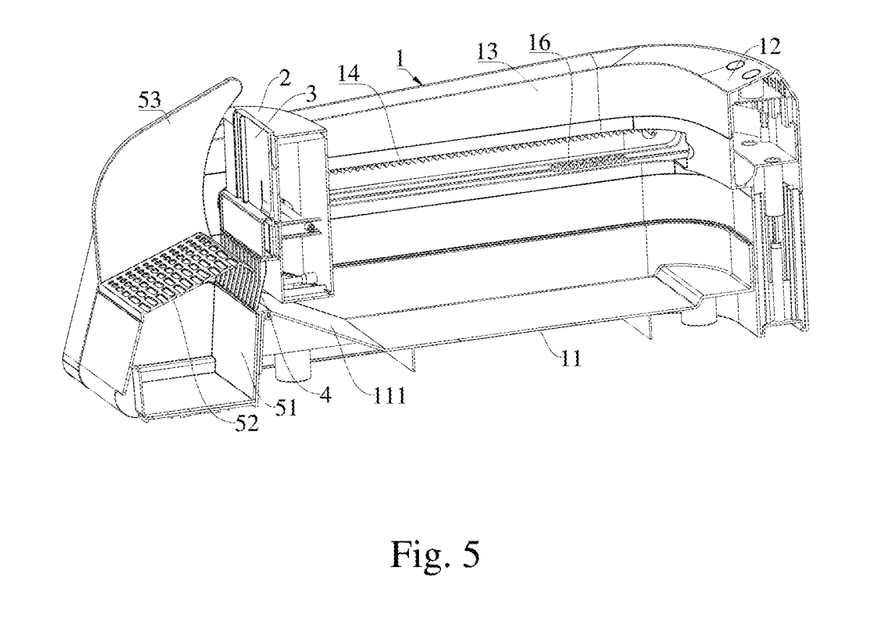
FIG. 5 is a sectional view of the cat litter box.

In one or more embodiments, a second lift driving rack 16 is further disposed in the linear slot 131, the second lift driving rack 16 is disposed to be close to the end wall 12 and is used to be meshed with the transmission gear 24, a plurality of slotting teeth are disposed in the main body 1, and the slotting teeth are disposed to correspond to gaps between every two adjacent rake teeth 4 and are fixedly connected to the end wall 12 or the side walls 13.

Figure 7:
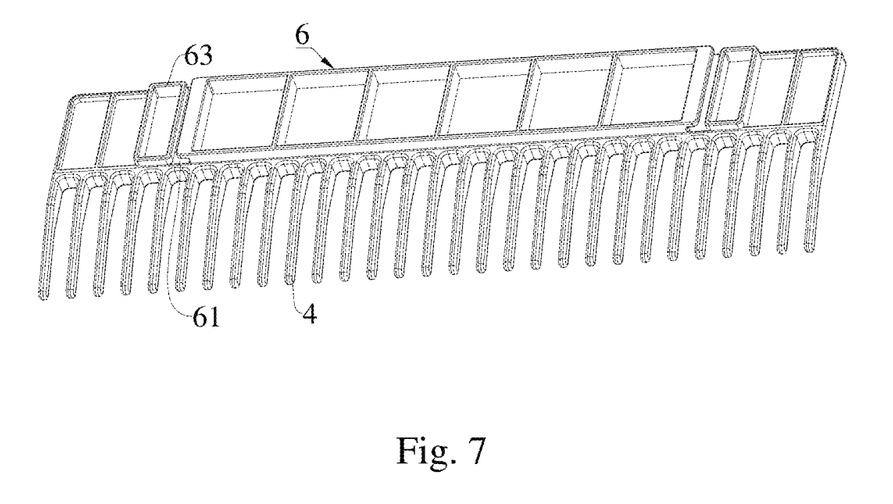
FIG. 7 is a schematic structural view of a seat body in the cat litter box.

As shown in FIG. 2 and FIG. 7, the cat litter box further includes a seat body 6, wherein the rake teeth 4 are disposed on the seat body 6, and the seat body 6 is detachably connected to the mounting part 3.

In some embodiments, the seat body 6 and the rake teeth 4 are of an integrated structure formed by integrated processing. For example, the seat body 6 and the rake teeth 4 are of an integrated structure formed by integrated injection.

Figure 6:
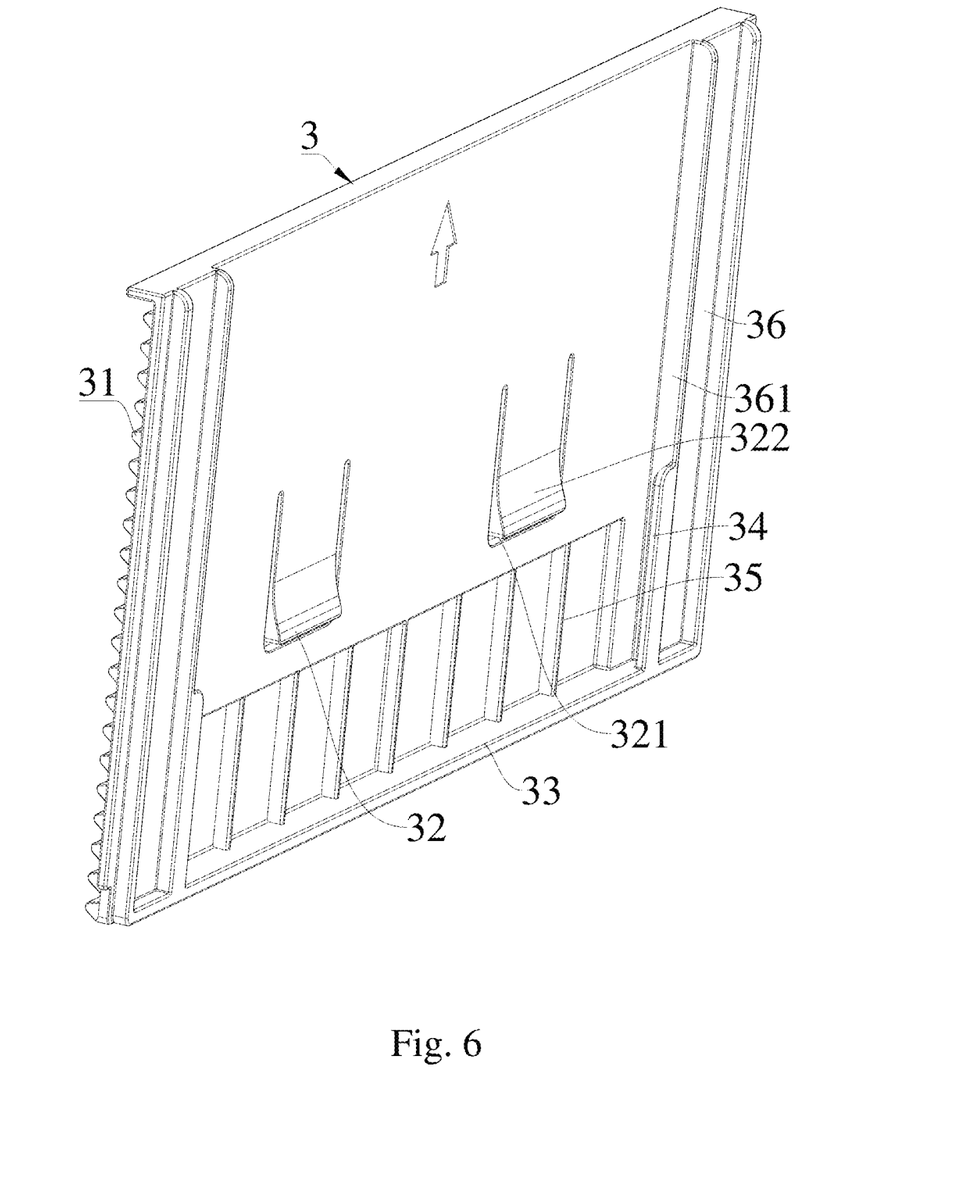
FIG. 6 is a schematic structural view of a mounting part in the cat litter box.

In conjunction with FIG. 2, FIG. 6 and FIG. 7, elastic clamping blocks 32, a supporting portion 33 and a first limiting portion 34 are disposed on the mounting part 3, limiting areas 35 are formed between each of the elastic clamping blocks 32 and the supporting portion 33, and the first limiting portion 34 is disposed to correspond to the limiting areas 35; the seat body 6 is limited in the limiting areas 35 and is provided with a second limiting portion 61; and the first limiting portion 34 cooperates with the second limiting portion 61 to stop the seat body 6 from separating from the mounting part 3 from one side of the limiting areas 35.

In one or more embodiments, the second limiting portion 61 is a clamping slot, the first limiting portion 34 is a clamping block, and the clamping slot is L-shaped or T-shaped.

Bottoms of the elastic clamping blocks 32 are provided with first abutting planes 321, and the upper part of the seat body 6 is provided with a second abutting plane 62 in contact with the first abutting planes 321; the lower part of the seat body 6 abuts against the supporting portion 33, that is to say, the seat body 6 is clamped by the elastic clamping blocks 32 and the supporting portion 33, and thus, the seat body 6 and the mounting part 3 are relatively fixed.

In order to facilitate mounting the seat body 6 and the mounting part 3, a guide slot 36 is disposed in the mounting part 3, a guide block 63 cooperating with the guide slot 36 is disposed on the seat body 6, the guide block 63 is slidably disposed in the guide slot 36 in a first direction, the first limiting portion 34 stops the seat body 6 from separating from the mounting part 3 in a second direction, and the second direction is vertical to the first direction. In one or more embodiments, the first direction is a vertical direction, and the second direction is a horizontal direction.

In some embodiments, the guide slot 36 in the mounting part 3 consists of two vertical ribs 361 disposed on the mounting part 3, the guide slot 36 is located between the two vertical ribs 361, and in order to facilitate processing the mounting part 3, the first limiting portion 34 and one of the vertical ribs 361 are of an integrated structure formed by integrated processing, such as an integrated structure formed by integrated injection.

The elastic clamping blocks 32 are provided with guide surfaces 322 that are inclined surfaces or arc surfaces.

In one or more embodiments, two elastic clamping blocks 32 are provided, and the two elastic clamping blocks 32 are spaced side by side.

Above descriptions are only disclosed embodiments, and are not intended to hence limit the patent scope. Any equivalent transformations made according to the disclosed contents of the description and the accompanying drawings are directly or indirectly applied to the related art and also fall within the patent protection scope in a similar way.

The invention claimed is:

1. A cat litter box, comprising:
a main body, the main body comprising a base plate, an end wall and two side walls, two opposite sides of the base plate being respectively connected with the side walls, one end of the base plate being connected to the end wall, the end wall being respectively connected to the two side walls, an inclined guide wall being disposed on the other end of the base plate, a linear slot being disposed in each of the side walls, a traveling rack and a first lift driving rack being disposed in the linear slot, and the first lift driving rack being disposed to be away from the end wall;
a moving part, a driving motor and a shaft part being disposed on the moving part, the driving motor being connected with a traveling gear, the traveling gear being meshed with the traveling rack, the shaft part being rotatably disposed on the moving part, and a transmission gear and a lift driving gear being fixedly disposed on the shaft part, and the transmission gear being used to be meshed with the first lift driving rack; and
a mounting part, the mounting part being disposed on the moving part in a liftable way and being connected with a plurality of rake teeth, and a lifting rack meshed with the lift driving gear being disposed on the mounting part.

2. The cat litter box according to claim 1, further comprising a collection box having an opening in the top, wherein the collection box is placed on the other end of the base plate and is close to the inclined guide wall.

3. The cat litter box according to claim 2, further comprising a box cover used for sealing the opening of the collection box, wherein the box cover is provided with a contact arm used for contacting with the moving part and is rotatably connected to the side walls or the collection box.

4. The cat litter box according to claim 1, wherein a first guide wheel is disposed on the moving part, and the first guide wheel is located in the linear slot and is in contact with the side walls.

5. The cat litter box according to claim 4, wherein the driving motor is connected to the traveling gear by a transmission shaft, a second guide wheel is disposed on the transmission shaft, and the second guide wheel is located in the linear slot and is in contact with the side walls.

6. The cat litter box according to claim 5, wherein the moving part is provided with a fixed seat, the shaft part and the transmission shaft are respectively and rotatably disposed on the fixed seat, and the first guide wheel is rotatably disposed on the fixed seat.

7. The cat litter box according to claim 1, wherein a second lift driving rack is further disposed in the linear slot, the second lift driving rack is disposed to be close to the end wall and is used to be meshed with the transmission gear, a plurality of slotting teeth are disposed in the main body, and the slotting teeth are disposed to correspond to gaps between every two adjacent rake teeth.

8. The cat litter box according to claim 1, further comprising a seat body, wherein the rake teeth are disposed on the seat body, and the seat body is detachably connected to the mounting part.

9. The cat litter box according to claim 8, wherein the seat body and the rake teeth are of an integrated structure formed by integrated processing.

10. The cat litter box according to claim 8, wherein elastic clamping blocks, a supporting portion and a first limiting portion are disposed on the mounting part, limiting areas are formed between each of the elastic clamping blocks and the supporting portion, and the first limiting portion is disposed to correspond to the limiting areas; the seat body is limited in the limiting areas and is provided with a second limiting portion; and the first limiting portion cooperates with the second limiting portion to stop the seat body from separating from the mounting part from one side of the limiting areas.

11. The cat litter box according to claim 10, wherein the second limiting portion is a clamping slot that is L-shaped or T-shaped.

12. The cat litter box according to claim 10, wherein bottoms of the elastic clamping blocks are provided with first abutting planes, and the upper part of the seat body is provided with a second abutting plane in contact with the first abutting planes.

13. The cat litter box according to claim 10, wherein a guide slot is disposed in the mounting part, a guide block cooperating with the guide slot is disposed on the seat body, the guide block is slidably disposed in the guide slot in a first direction, the first limiting portion stops the seat body from separating from the mounting part in a second direction, and the second direction is vertical to the first direction.

14. The cat litter box according to claim 10, wherein the elastic clamping blocks are provided with guide surfaces that are inclined surfaces or arc surfaces.

15. The cat litter box according to claim 10, wherein two elastic clamping blocks are provided, and the two elastic clamping blocks are spaced side by side.

* * * * *